United States Patent [19]

Bell et al.

[11] Patent Number: 4,595,616

[45] Date of Patent: Jun. 17, 1986

[54] ENCAPSULATED INDUCTIVE DEVICES WITH POLYBUTADIENE ENCAPSULANT

[75] Inventors: Gordon M. Bell, Fort Wayne; James R. Ridlen, Spencerville, both of Ind.

[73] Assignee: General Electric Company, New York, N.Y.

[21] Appl. No.: 662,644

[22] Filed: Oct. 19, 1984

Related U.S. Application Data

[62] Division of Ser. No. 349,736, Feb. 18, 1982, Pat. No. 4,485,218.

[51] Int. Cl.$^4$ .......................... B29B 1/04; B29B 3/02; B29B 3/14
[52] U.S. Cl. ...................... 428/68; 428/521; 428/76; 525/264; 264/272.11
[58] Field of Search .................. 264/272.11; 525/257, 525/263, 264, 265, 305, 332.5; 428/68, 521

[56] References Cited

U.S. PATENT DOCUMENTS

| | | | |
|---|---|---|---|
| 3,488,616 | 1/1970 | Duncan et al. | 336/96 |
| 3,751,378 | 8/1973 | Cowperthwaite et al. | 525/264 |
| 3,970,723 | 7/1976 | Mees et al. | 525/257 |

Primary Examiner—Wilbert J. Briggs, Sr.
Attorney, Agent, or Firm—Walter C. Bernkopf; Richard A. Menelly; Fred Jacob

[57] ABSTRACT

Improved encapsulating compositions for inductive devices are provided. The composition has a polybutadiene base and contains an initiator, an inhibitor and a co-agent for improving the curing of the composition under the influence of the initiator.

Certain compositions are usable at higher temperatures than prior polybutadiene base encapsulating compounds based on a conditioning of the composition during cure at or near the projected use temperature. When combined with high temperature conductor insulation coatings, such as polyimides, a high temperature encapsulating system is achieved.

Certain compositions are usable to provide a soft cure encapsulation from which an encapsulated inductive device may be liberated without damage to the device. For such compositions, soft curable polybutadienes are employed and particularly those having high trans and cis components.

5 Claims, 2 Drawing Figures

ENCAPSULATED INDUCTIVE DEVICES WITH POLYBUTADIENE ENCAPSULANT

This is a divisional of application Ser. No. 349,736, filed Feb. 18, 1982, now U.S. Pat. No. 4,485,218.

BACKGROUND OF THE INVENTION

The present invention relates generally to induction devices such as transformers which are encapsulated in a polymeric medium. More specifically, the invention relates to dry type induction devices which are enclosed within an encapsulant.

The current state of the art of the encapsulation of dry type induction devices such as transformers involves the use of solvent-containing and also solventless encapsulants or impregnants. The silicone resins have been used for such encapsulation and may involve the use of solvent. Thermoset polybutadienes have been used in place of the silicone resin and have been used without solvent. Generally, the polybutadienes have lower cost than the silicones and also, in a general way, the thermoset polybutadienes have been formulated and employed as direct replacement for the more costly and problematic silicone compositions.

Also, in a general sense, the use of the silicone has not been displaced by the solventless thermoset polybutadienes in one significant segment of this technology. The silicone compositions have continued to be used in those applications where access to the induction device is desired for some reason after the encapsulating polymer has been cured. In the case of hard cure thermoset polybutadienes, the efforts to liberate the induction device such as a transformer from the encapsulant has lead to the destruction of the contained apparatus because of the hardening of the encapsulant. Accordingly, the solventless thermoset polybutadiene composition cannot be employed in encapsulating apparatus which may, after cure has been effected, be subjected to some modification of the apparatus.

The more expensive silicone compositions have been employed on a continuing basis for those installations which may be subjected to or have a requirement for modification or adjustment after the encapsulation and curing has been completed. For transformers, this includes post cure adjustment, non-destructive tear-down or other rework which may be carried out, or which one may desire to carry out, after the encapsulation has been completed. Where encapsulation with the relatively hard curing thermoset polybutadiene has been carried out, then such non-destructive tear-down or rework is not feasible because of danger of damage to the equipment as well as the great difficulty of trying to remove the hard cure thermoset polybutadiene without doing damage to the equipment.

A practical basis for the use of the disassembly technique in repair or modification of transformers involving the use of the silicone resins as encapsulants is the repair of the transformer after removal from the enclosed container and the removal of the coil from the core of the transformer by dismantling the core. The coil may then be repaired or may be completely replaced with a new coil but the magnet steel of the transformer is saved and reused. The coil, if it is repairable, may be repaired and returned to the transformer in good condition so that it can pass the normal test requirements in a final inspection. By contrast, if the transformer cannot be removed, then the transformer, including the core and the coil and magnet steel of the core as well as the basic housing, must be written off as a loss.

Pursuant to one aspect of the present invention, an elastomeric polybutadiene may be employed in forming a novel elastomeric encapsulant formulation and the novel formulation may be cured to a dry state and when so cured be of a consistency such that the core can be dismantled from the transformer. The coil can be removed from the core to be repaired or to be replaced. The transformer can be repaired or reconstructed with the same magnet steel thus saving the cost of the magnetic steel and depending on the condition of the core, saving also the cost of the coil. As a consequence, the core and coil does not have to be scrapped and written off as a loss.

Another application for encapsulants of magnetic devices is the encapsulation of devices which use strain sensitive torroidal ferrite cores. It has been a practice in the industry to coat such cores by a very high cost process known as the "parylene process", which is a high technology process available under license agreement with Union Carbide Company. The parylene process involves the deposition of a strain-free, continuous polymer film based on pyrolysis of a composition followed by subsequent condensation. Because of the nature of the process, providing the necessary equipment and paying the necessary cost, makes the process an expensive one. Surprisingly, it has been found that it is feasible to provide an elastomeric formulation based on elastomeric polybutadiene which serves the purpose of encapsulating the strain sensitive torroidal ferrite cores and it is feasible to do so at a substantially lower cost. It has been found in fact that through use of the process and composition of the present invention, encapsulated strain sensitive torroidal ferrite cores can be suitably encapsulated to provide three significant advantages as follows.

1. The novel elastomeric composition has a low, unvarying dielectric constant,
2. The novel elastomeric composition further has a low dissipation factor, and
3. It has been found that the novel elastomeric composition is virtually strain-free.

Strain sensitive toroidal ferrite cores are used to make high frequency transformers or high frequency conductors to be used in AC and DC power supplies. The prior art technology for coating the cores involved an expensive coating produced by the parylene process as described above or painting or, as an alternative, a polyester coating. However, these prior art coatings, except for parylene, are very hard. During the aging of the magnetic component, specifically, the strain sensitive torroidal ferrite core, the prior art hard coatings become harder and harder as the coating material is aged due to oxidation and heat. This hardening puts a stress on the ferrite core and changes the magnetic properties of the core. For example, using the prior art processes, a high frequency inductor has been aged and changes from one value of inductance to a lower value of inductance because of the strain that prior art hard materials put on the core during the aging period.

Further, it has been observed that the prior art encapsulant materials are subject to change of their electrical characteristics during the aging process. For example, the electrical characteristics, specifically, dielectric constant and dissipation factors, have been observed to change during the aging process. It is further known that in a high frequency inductor or transformer, a change of the dielectric constant or dissipation factor of the encapsulant changes the characteristics of the magnet component. As a result of such change, it has been observed that the electrical characteristics of the magnet component will stray outside of the specified limits for either the inductance or capacitance or undergo other losses of electrical characteristics due to aging.

The patent to McElroy, U.S. Pat. No. 3,678,121, describes the preparation of a high vinyl liquid polybutadiene, but does not describe any scheme by which encapsulation such as is taught in the present invention may be accomplished.

The Bockstie U.S. Pat. No. 4,147,477 concerns the use of high vinyl butadiene polymer for coating electrical components. The components which Bockstie refers to are resistors and the composition which he describes would lend itself more to a hard curing thermosetting encapsulant than it would to an elastomeric type of encapsulant.

The U.S. Pat. No. 3,079,295 teaches resinification by grafting of styrene or vinyl toluene but does not teach the formation of an elastomeric encapsulant formulations.

Another feature of the present invention, in another of its aspects, is the provision of encapsulant compositions which are usable at higher temperatures of 220° C. or the like.

Some prior art patents relate to the use of polybutadiene as encapsulant composition in a general way. One such patent is Mees et al U.S. Pat. No. 3,970,723 which is assigned to the same assignee as the subject application. It does describe use of a polybutadiene for encapsulation of transformers. The polubutadiene composition taught is not taught to be useable at elevated temperatures nor is there any technique, method or means taught by which it may be useable at such higher temperatures. Because the composition of the Mees et al U.S. Pat. No. 3,970,723 is a hard curing thermosetting polybutadiene, the material does cure to a hard state and the hard cure of the encapsulant effectively prevents the modification or repair of the magnetic element which is encapsulated therein.

As indicated above, another deficiency of prior art encapsulants for induction devices such as transformers is the limitation on the temperatures at which they can operate either for short time intervals or for extended time intervals unless very high cost materials such as silicones are used in the encapsulation.

According to the known prior art, one high temperature, e.g. 220° C., insulation system for encapsulation of induction devices such as transformers consists of a polyimide magnet wire insulation and, specifically, the Dupont ML polyimide magnet wire insulation together with a silicone varnished treatment or a high temperature polyester treatment. Such combinations are capable of operating at 220° C. Another combination of insulations which have been used in connection with transformers for high temperature operation is the combination consisting of a Dupont NOMEX wrapped wire insulation along with a silicone varnished treatment of the transformer. However, it is also known that the Dupont ML wire insulation, as well as the NOMEX insulation, are expensive and also it is known that the silicone varnish is very expensive.

There are, in fact, two sets of deficiencies of the presently used prior art encapsulant systems. A first of the deficiencies as described above relates to the failure of the lower cost systems involving polybutadiene to permit access to the encapsulated apparatus or equipment at a later time following curing. A second deficiency is that there has been no low cost encapsulant systems which permit operation at desired elevated temperatures such as those described immediately above.

However, pursuant to the present invention, there is provided a system for encapsulation of inductive devices which can be employed either in the encapsulation of such devices in a fashion which permits later liberation of such devices without their destruction and the system of the present invention does also permit the option of a relatively high temperature operation without loss of important operating properties of the system components or of the apparatus.

Further, the present invention provides a system which permits both operation at elevated temperatures and liberation of the encapsulated induction apparatus.

OBJECTS OF THE INVENTION

It is accordingly one object of the present invention to provide reworkability in encapsulated dry type transformers while retaining all the desirable attributes of the encapsulating composition, comparable to those of the hard curing thermoset polybutadienes.

It is another object of the present invention to provide ease of reworking of a composition which in the initial stage has relatively high ease of processing to the encapsulated form.

Another object is to provide a reworkable encapsulating composition which has good electrical properties but has lower cost than that of silicones.

Another object of the present invention is to provide a reworkable encapsulating composition having excellent electrical properties.

Another object is to provide an encapsulating composition having desirable high temperature properties and having a use rating in the range of a 220° C. insulation system.

Another object of the present invention is to provide an encapsulating system which is operable at designated temperatures and for which the encapsulating compound is compatable with an insulation coating or compound on the conductor encapsulated within the system.

Another object is to provide a system employing a polybutadiene base composition at a temperature above the temperature at which polybutadiene has been employed in such encapsulating applications in the past.

Another object is to provide a high temperature encapsulating system which may not have the capability for being reworked after being cured in place.

Still another object is to provide a high temperature encapsulating system based on polybutadiene which does have the capability of being reworked after the composition has been cured in place.

Another object is to provide a novel combination of a compatible polyimid wire coating system with an encapsulating polybutadiene system having high temperature operating capabilities of 220° C. and above.

Other objects will be in part apparent and in part pointed out in the specification which follows.

BRIEF STATEMENT OF THE INVENTION

The present invention may be practiced by employing a polybutadiene base encapsulating compound for encapsulating inductive devices such as transformers; selecting the polybutadiene base from the group comprising elastomeric polybutadiene and thermoset polybutadiene; compounding the selected polybutadiene; and subjecting the compounded polybutadiene to curing temperatures which permit the desired combination of cured properties to be obtained. Where elastomeric polybutadiene is selected, the polybutadiene component of the composition has relatively high trans-1,4 polybutadiene in the range of 60% and has a smaller percentage of cis-1,4 polybutadiene in the range of 20%. The remainder of the elastomeric polybutadiene may be vinyl-1,2 polybutadiene. Where the elastomeric polybutadiene has been selected, the curing of the material may be at lower temperatures comparable to those conventionally used and the composition may be suitable for use at the lower temperature ranges of up to about 180° C. where hard cure thermoset polybutadiene compositions have been used in the past.

Where high temperature operation of the compound is desired, the treatment and curing of the composition, whether it be based with elastomeric polybutadiene or with thermoset polybutadiene, is carried out at a temperature which is proximate or above the temperature at which the composition is to be used. Also, where higher temperature operation is sought, the ingredients selected for use in combination with the polybutadiene must also be compatable with the polybutadiene employed and must also have the temperature stability for use at such temperature. Generally, the polyimide compounds have been found both compatible with the polybutadiene compounds of this invention for use at the higher temperatures and also have been found suitable for stable use at such elevated temperatures.

BRIEF DESCRIPTION OF THE DRAWINGS

The following description of the invention will be better understood by reference to the accompanying drawings in which.

DETAILED DESCRIPTION OF PREFERRED EMBODIMENTS

Figure 1:
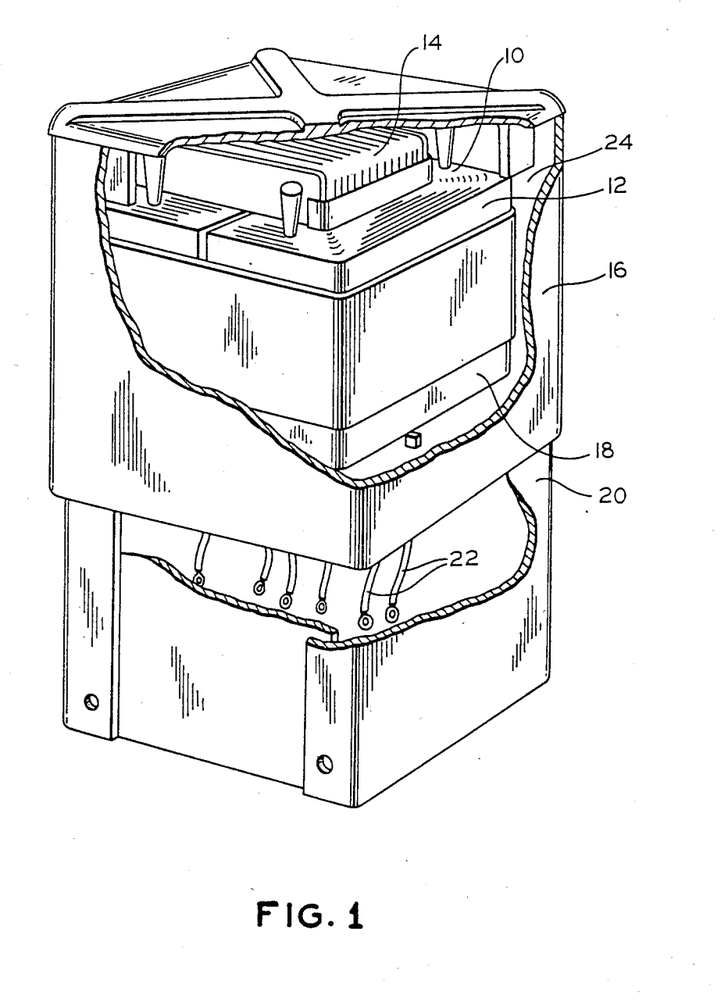
FIG. 1 is a perspective view, partially cut away, showing a totally enclosed core and coil assembly.

The totally enclosed transformer of FIG. 1 is of a type generally employed in control systems. Illustrated are a core and coil assembly 10 including a magnetic core 12 and a coil 14. The particular type of core and coil assembly are not critical to the present invention. The core and coil assembly 10 is contained within a transformer case or enclosure 16 and a barrier 18, of some type, is generally positioned beneath the core and coil assembly 10. A lead compartment 20 is fitted beneath the open end of enclosure 16 for placement of transformer leads 22.

With the type of transformer illustrated in FIG. 1, two methods for employing the resin system of the present invention are possible. In the first case, the resin system is employed as an impregnant. The space 24 between the core and coil assembly 10 and the enclosure 16 is filled with a phenolic coated sand. This phenolic coated sand is heated so as to fuse the coatings of adjacent particles to each other, resulting in a porous mass. After this porous mass has cooled, so as to solidify it, the resin system of the present invention is vacuum impregnated into the pores and is cured in place.

In a second method, the resin system of the present invention is combined with a particular type of sand, the sand being carefully selected as to size, purity, and shape in order to provide a substantially void-free encapsulating mass. In general, this sand is 99% pure silicon dioxide sand, at least 95% by weight of the sand being between U.S. Standard Sieve Sized 10 and 20, i.e. within a range of 1981 to 833 microns. Generally, it is desired that at least 70% of the sand be between U.S. Standard Sieve Sizes 14 and 16, i.e. within a range of 1397 to 1167 microns. Further, the sand should have a maximum ferrous oxide content of 0.110%. The resin system of the present invention and the sand are mixed, the overall composition having from 25 to 18% of the resin system of the present invention and from 75 to 82% sand, both percentages by weight. This mixture is then placed around the core and coil assembly 10 of FIG. 1 in space 24 in order to encapsulate the core and coil assembly 10.

Figure 2:
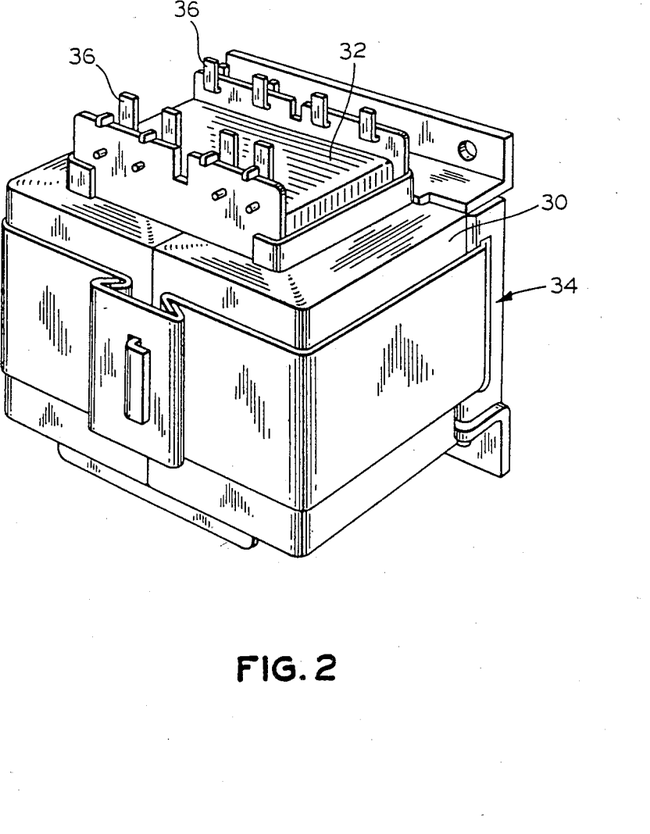
FIG. 2 is a perspective view of a transformer core coil.

The transformer of FIG. 2 is of a type generally employed in machine tools. It includes a core 30, coil 32, and a frame member 34 to hold the various parts together. Terminals 36 are also provided on the structure. In general, the insulating resin system of the present invention is coated over a transformer of the type shown in FIG. 2 as by dipping the transformer into a bath containing the resin system of the present invention.

It will be understood that the encapsulants and encapsulating systems of the present invention are applicable to a wide variety of encapsulatable induction devices and are not limited to those illustratively shown in the Figures. For example, one type of transformer using the 220° C. system is the 30 KVA to 1000 KVA large transformers which are impregnated with the encapsulant compositions of the present invention.

Systems for encapsulating induction apparatus have been known in the past and one such system is described in the U.S. Pat. No. 3,970,723, which is assigned to the same assignee as the subject application, and the text of that patent is included herein by reference. The patent describes encapsulation of dry-type transformers in resinous materials dissolved in the solvent and, particularly, aromatic solvents. The problem of dealing with the solvents of such prior art solvent systems are described in the U.S. Pat. No. 3,970,723. The same patent also describes the novel resin composition for encapsulation of dry-type transformers incorporating three enumerated components and a peroxide initiator. Such compositions are based on hard cure polybutadiene and include initiator, kicker and inhibitor components. Hydroquinone is indicated to be employed as an inhibitor of the polymerization to keep the components in a fluid state until they are in place in the apparatus, and a conventional peroxide is indicated to be the peroxide initiator. The system of the U.S. Pat. No. 3,970,723 is stated to have insulation capabilities to 180° C. Also, once the composition has been cured in place, the removal of the polymer without damaging or destroying the contained transformer apparatus is extremely difficult, if at all possible.

As used herein, the following terms have the definitions as set out hereinbelow.

INHIBITOR

The inhibitor employed is generally selected from the group consisting of quinones and hydroquinones. Preferably, the inhibitor is hydroquinone employed in amounts of from 0.1 to 0.9 parts by weight based on the weight of the polybutadiene component. The resin system of the present invention is generally used with an inhibitor to prevent premature polymerization of the components. The concentration given above for the inhibitor, particularly hydroquinone, is accordingly a preferred range of this composition and the presence of the inhibitor is not essential to the practice of the present invention.

In order for the resin system of the present invention to be used to great effectiveness, it must be storage stable. By this is meant that the mixture of the various components can be held together in large quantities at that temperature without any significant cure taking place. As an aid to assuring this storage stability, quinone and hydroquinone, in amounts from 0.1 to 0.9 parts by weight, are preferably incorporated in the resin system. A preferred material is hydroquinone.

Unless otherwise indicated herein, all concentrations are stated in parts by weight based on 100 parts of the base polymer.

ELASTOMERIC POLYBUTADIENE

Certain compositions of the present invention comprise elastomeric encapsulant formulations, the compositions of which are based upon an elastomeric curing rather than a hard curing thermosetting polybutadiene resin. To the Applicant's knowledge, no prior use of formulated elastomeric compositions as taught herein for encapsulation of induction devices has been carried out. The major differences in the polybutadiene configuration of elastomeric cured as compared to the hard cured materials is set out in the following table:

| Soft Cure or Elastomeric Polybutadiene | Hard Cure Polybutadiene |
|---|---|
| Trans - 1,4 polybutadiene 60% | Trans - 1,4 polybutadiene 10–20% |
| Cis - 1,4 polybutadiene 20% | Cis - 1,4 polybutadiene trace |
| Vinyl - 1,2 polybutadiene 20% | Vinyl - 1,2 polybutadiene 40–80% |

For an elastomeric polybutadiene employed pursuant to the present invention, the trans-1,4 polybutadiene can vary from 54 to 66%, the cis-1,4 polybutadiene can vary from 16 to 24%, and the vinyl-1,2 polybutadiene can vary from 16 to 24% with the sum of percentages adding up to 100%.

A commercially available polybutadiene which can be cured at 160° C. for about 4 hours to produce a very soft encapsulant is sold under the commercial designation ARCO-R-45HT.

This composition can be soft cured pursuant to the present invention for use at higher temperatures but it must be cured at the higher temperatures approximating the temperature of prospective use in order to be rendered thermally stable for use as a transformer encapsulant. For example, if this material is to be used at a temperature of 220° C. hotspot, then the soft curing of the composition should be at 210°–220° C.

INITIATOR

While a variety of peroxide initiators can be employed, including benzol peroxide, lauryl peroxide and dicumyl peroxide, the preferred peroxide initiator is that sold under the name Lupersol 101. The Lupersol 101 has the following structural formula:

The peroxide initiator is employed in amounts of from 2.5 to 5 parts by weight. The presence of a peroxide as an initiator is deemed to be essential to the practice of the present invention. The concentration range of the peroxide as given above is a preferred range of concentration, but the peroxide is not an optional component and must be present in order to practice the present invention.

An initiator is required for effecting the curing reaction between the various components of the present system.

"KICKER"

As described in U.S. Pat. No. 3,970,723, a "kicker" and, specifically, trimethylol propane trimethyacrylate, is a useful ingredient pursuant to the present invention and has the following structural formula:

From 0 to about 10 parts of trimethylol propane are contemplated for use in the composition of the present invention. The trimethylol propane trimethacrylate is a monomer which may be included in the composition of the present invention, as in the composition of the patent '723, because it is a material which has a higher functionality than the vinyl monomer and, specifically, the vinyl toluene. Because of this higher functionality, the material is more reactive than the other monomer and as such serves as a kicker to initiate the curing reaction. The trimethylol propane trimethacrylate is a desirable material for use as a kicker, but other materials which have a high functionality may be employed in its stead. However, the trimethylol propane trimethacrylate is not an ingredient which is essential to the practice of the present invention and, as indicated above, it may be omitted from the formulation of the composition of the present invention. It is, however, a preferred ingredient.

VINYL TOLUENE

The vinyl toluene which may be used in the present invention is selected from a group consisting of a vinyl toluene having one of the following structural formulas:

From 0 to about 40 parts of vinyl toluene are employed in compositions of the present invention. The vinyl toluene is thus an optional ingredient although a preferred ingredient.

Various accessory components may be employed in connection with the present invention. For example, either an asbestos sheet insulation may be employed as a layer of insulation and as the insulation between the high voltage and the low voltage coil of the transformer, or a layer of Dupont NOMEX may be employed as the insulating layer between the high voltage and the low voltage coil.

Combinations of material as described above have been incorporated in life test transformer models and have been life tested according to the IEEE Test Procedures. From these tests, it was learned that the insulation system as described herein would have an index of 220° C. or greater. More accurately, the life testing according to the IEEE test procedures, has been completed with regard to life test temperatures and from these completed tests, the inference has been drawn that when all tests are completed the insulation system described above would have an index of 220° C. or greater.

The particular tests were carried out on a system which includes a polyimide coating on the wire as developed by Marvin A. Peterson and described in the copending application Ser. No. 150,725 filed May 19, 1980, now abandoned. This coating on the transformer coil is a polyimide composition although it is not an ML polyimide as it is not supplied by the Dupont Company, but rather is a product of the General Electric Company. The cost of the GE polyimide as used and as described above is less expensive than the ML wire insulation. Also, the polybutadiene treatment compound as provided pursuant to the present invention is a high temperature treatment compound and the combination of the polyimide wire coating and the polybutadiene compounds of this invention create a high temperature insulation system having a temperature rating of 220° C. or higher.

By experimentation and test, it has been found that a polybutadiene containing compound must be cured at a temperature which is proximate the 220° C. rating of the insulation system and at a temperature, for example, of 210° C. to induce the thermal stability in the system.

Regarding the thermal stability of a polymer system, the rating which is applied is one intended to designate the capability of the system to operate at a specified temperature over an extended period of time. The time will effectively be a matter of years. It is a standard and accepted practice within the industry to develop a correlation between the behavior of compositions within a limited period of time at a higher temperature and their behavior at a lower temperature over an extended period of time. For example, compositions which are to be rated at an operating temperature of 220° C. would have to be tested at the 220° C. over a considerable period of years in order to be sure that the composition being tested will operate successfully at the 220° C. temperature over the several year period necessary for qualification as a 220° C. composition. However, the industry and the standard-making organizations such as the IEEE and similar organizations, have developed and established Accelerated Life Test procedures for qualifying compositions for use at such high temperatures based on shorter term thermal aging at more elevated temperatures. One such procedure is the life test performed according to the IEEE No. 259 procedure which includes thermal aging, cold shock, humidity and proof tests. This procedure requires that the life test be made at three different temperatures, the highest temperature being 270° C. For example, a composition such as is disclosed in the Mees et al patent referred to above, has a rating of 180° C. In order to qualify as a composition having a 180° C. rating, the composition is thermally aged at higher temperatures and, as indicated above, the highest temperature of heating is 270° C. In actuality, in order to qualify as a 180° C. system, thermal aging at 270° C. for 350 hours is required as the log average of the failures. The composition of the Mees patent was heated to 270° C. and a time at temperature log average number of hours of 516 hours was obtained. See in this connection column 8, starting at line 25, of Mees U.S. Pat. No. 3,970,723. This 516 hour heat tolerance does not in any way imply that the insulation system would be operable at 220° C. On the contrary, it may imply that the composition would function at a temperature above 180° C. and perhaps as high as 190° C. as a maximum.

For an insulation system to have a rating of 220° C. operation, it must be tested at the 270° C. test point for approximately 5,000 hours and to qualify as a 220° C. insulation system, the required hours at 270° C. is approximately 5,000 hours. Accordingly, it is readily evident that the composition of the Mees and Bell patent which did have a 180° C. rating and which did operate based on tests at 270° C. for 516 hours as a log average number of hours, could not be rated as a 220° C. insulation system and would not obtain a thermal index of 220° C. for the insulation materials in that system. However, the composition of the subject application did operate at more than 5,000 hours at the 270° C. temperature.

The principle difference between a composition such as is taught in the Mees and Bell patent which operates at and has a rating of less than 190° C., and a composition as provided pursuant to the present invention, which has a rating of 220° C., is the conditioning temperature or, more specifically, the temperature at which the composition is cured. As indicated above, the cured temperature should be about 210° C. for a composition which is to be used and to operate at a temperature of 220° C.

The life test data taken according to the IEEE No. 259 procedures is concrete evidence of the thermal index of the insulation system of the compositions of the Mees and Bell U.S. Pat. No. 3,970,723 as set out in the paragraph of that patent starting at column 8, line 9. The test data does show that the insulation system consisting of the polybutadiene base composition of the Mees patent and the magnet wire as used therein did give good 180° C. insulation system performance for the disclosed system.

The Duncan and Mees U.S. Pat. No. 3,488,616 does point out in columns 1 and 2 thereof, the need for a compatibility between the composition of the wire insulation and the composition of the wire insulation and the composition of the encapsulating material. As Duncan points out in column 1, line 62, "Certain synthetic resins have been found to be compatible with the wire insulation used in the electrical coil or coils of the coil assembly. The resin encapsulant must not attack and degrade the wire insulation, either during curing of the resin or after continued contact between the resin and insulation after the resin is cured." The disclosure of the Duncan and Mees U.S. Pat. No. 3,488,616 is incorporated herein by reference.

As the Duncan patent points out in column 3, starting at line 69, the resin used in the improved encapsulating composition must be compatible with the insulation on the coil 16, which in the exemplification of the invention were the isophthalate and teraphthalate polyesters. As pointed out in this application, these polyester coil or wire insulations are unsuitable for use in the subject invention in that aspect of the invention which provides the high temperature use capabilities at temperatures in the 220° C. category, although they were found by Duncan to be suitable for use in structures which are to be used at a rating of 180° C. as taught in his patent. Also, as Duncan points out in column 4, starting at line 33:

"Table I below sets forth the results of actual in-residence tests of the various resin compositions, constituents and several wire insulations."

From an examination of the test and of the Table I contents, it is evident that testing was conducted to temperatures of up to 180° C. and up to a temperature of 200° C. for the polybutadiene and compatibility of the isophthalate or teraphthalate polyester and of nylon were measured. Some effect on nylon was observed. However, no consideration was given to the interaction or effect of the wire insulation and the encapsulant temperatures over 200° C. and in the range of 220° C. in which the composition of the present invention is operable and at which it is rated.

Based on the weight loss tests recited at the top of column 6, Duncan indicates his material was rated as a 180° C. material and that the weight loss measured at 300° C. for 2 weeks was sufficiently low to retain this 180° C. rating.

A new test requirement for insulation systems for electrical equipment is identified as Underwriters Laboratory Test No. 1446. This test has replaced a previous test which was a sealed tube test and required only a showing of compatibility of the polymer ingredients of the system. The earlier test required a compatibility showing within a sealed tube in a period of 2 weeks. The combination of ingredients of the present invention and, specifically, the use of the polyimide in connection with the compound containing the polybutdiene, meets the requirements of the new UL 1446 test.

It should be understood that the high temperature insulation system of the present invention includes a compound containing the polybutadiene which has been cured at or near the projected operating temperature and also includes a compatible insulating layer on the electrical component of this system and, particularly, on the metal surfaces thereof. However, the invention is not limited to a specific polyimide referred to as of General Electric origin, but also includes the polyimide of Dupont origin and known commercially as the Dupont ML polyimide. Also, it includes NOMEX material, also of Dupont origin and may include, for example, a polyetherimide or other similar high temperature metal coating compounds which are compatible both with the metal which they insulate and with the compound of this invention containing the polybutadiene and cured at or near the projected use temperature.

Pursuant to the present invention in another of its aspects, it is feasible to use a composition containing polybutadiene which can be cured to a soft composition in order to form an encapsulant system for encapsulating a inductive device such as a transformer under such conditions that it can be reworked or, in other words, be liberated from the composition. If such soft composition is to be used at a lower temperature, the choice of compatible conductor coatings is larger and includes polyester and other coatings having satisfactory performance at the lower use temperatures.

One soft cure polybutadiene base composition which is available commercially is sold under the commercial designation ARCO polybutadiene R45HT. The ARCO polybutadiene can be cured at 160° C. for about 4 hours and it will be found that the composition is very soft. This provides the advantage that the ARCO R45HT can be employed in forming a composition which can be reworked after the composition has been cured about the inductive device. Accordingly, this composition is one which falls within the perview of the present invention in that it is a polybutadiene base composition which is soft enough to permit it to be reworked in a manner similar to the reworking of the silicone potting compounds of the prior art.

Another polybutadiene base composition which is soft and reworkable after cure is one which includes Revertex Lithene AH and Lithene PL in an approximately 50/50 ratio. This composition can have the following ranges of ingredients:

| INGREDIENTS | PARTS |
| --- | --- |
| Lithene AH | 40 to 60 |
| Lithene PL | 60 to 40 |
| TMPT | 6 to 8 |
| Lupersol 101 | 2 to 3 |

In addition, however, the ARCO R45HT polybutadiene can be cured to produce a stable composition for operation in a transformer that will operate at 220° C. hotspot. In order to have the composition operate and to have the apparatus embedded within the composition operating at the 220° C. hotspot temperature, a polybutadiene base composition must itself be cured at a temperature of 210°–220° C. If the composition is cured at this temperature, it is found that it is suitable for use in operation at 220° C. hotspot.

The curing at the higher temperature of 210°–220° C. is thought to oxidize more unsaturated valence sites and to crosslink other sites which might have been unstable so that such sites will be thermally stable when the transformer is operating at 220° C. hotspot. The Applicants do not wish to be bound to any theory as to why it has been found feasible to form an encapsulating system for an induction device such as a transformer to operate at 220° C. hotspot where the curing itself has taken place at 210°–220° C., but states the method and steps by which the composition and system can be formed as given above, namely, by curing at or near the use temperature of the system.

For higher temperature soft cure compositions, the compatible polyimide or similar compatible high temperature metal coating materials must be used if desirable stability of the system (including the wire coating and encapsulating compositions) for use at 220° C. hotspot is to be achieved.

It has been found that the elastomeric polybutadiene base compositions when used for encapsulation of magnetic elements pursuant to this invention does not undergo hardening to the extent that the materials such as those produced by the parylene process or an alternative polyester coating undergoes such hardening at elevated temperatures. Also, during the aging of the material, the elastomeric polybutadiene base composition does not change with respect to its important electrical characteristics and, specifically, dielectric constant or dissipation factor. This permits the elastomeric polybutadiene base encapsulant to retain its magnetic properties within specified limits. Accordingly, it has been found that the combination of elastomeric polybutadiene base encapsulant for the magnetic elements avoids the imparting of stress to contained ferrite core. Further, it has been observed that through use of the present invention, and particularly the combination of the elastomeric polybutadiene base encapsulant with magnetic elements, that there is no change in the dielectric constant or dissipation factor of the elastomeric polybutadiene base encapsulant during the aging process which is at all comparable to the degree of changes which occur in the coating formed from the parylene process or a polyester coating as noted above. As a result, it has been found through practice of the present invention, that it is possible to maintain an encapsulated ferrite core within specified limits for the life of the ferrite core component and for the life of the power supply with which it is associated.

With regard now more particularly to the novel high temperature encapsulating system for inductive devices, it has been found by the Applicants that high temperature operation of encapsulant systems which incorporate polybutadiene base composition as an encapsulant, is preferably carried out by curing the polybutadiene base composition at or near or above the temperature at which it is to be used in place. For example, with regard to a commercially available polybutadiene, specifically, Revertex Lithene AH, if it is incorporated in a composition as described herein and cured at 160° C., it will cure to a rather hard structure in situ. Such a structure is different from that obtained by the cure of a material such as the ARCO R45HT. However, Applicants have found that if the cure of polybutadiene base compositions as taught herein is carried out at the high temperature close to the temperature of projected use, then the composition will be stable and remain stable at that use temperature. For example, if the composition including the Revertex Lithene AH polybutadiene is cured at a temperature of 210°–220° C., then the resultant cured composition can be used at this temperature.

EXAMPLE 1

A 30 KVA three-phase transformer was asembled and its active elements were treated with an elastomeric polybutadiene base composition as provided by the present invention. The elastomeric polybutadiene was cured in place. It was then taken apart to determine the ease or difficulty of disassembling the structure with the cured elastomeric polybutadiene encapsulant by comparison to the silicone that had been used previously for encapsulating the active elements of the transformer. It was found that the 30 KVA three-phase transformer could be disassembled with only slightly more difficulty than a silicone treated unit. The unit could be disassembled while it was cold. Following the disassembly, it was found that the unit could be reassembled using the same magnetic E-I steel and the reassembly was carried out.

EXAMPLE 2

A 75 KVA three-phase transformer was assembled and treated with an elastomeric polybutadiene base composition as provided pursuant to this invention to encapsulate the active components of the transformer in its housing. Following the curing of the polybutadiene, it was disassembled and during the disassembly, it was determined that it could be disassembled with slightly more difficulty than a similar transformer which had been treated with silicone as previously used. The 75 KVA three-phase transformer was constructed with lay-up magnet steel, that is, the three legs of the core were separate laminations of steel and the yokes at the bottom and the top were also separate laminations of steel. This type of transformer having the separate laminations is the kind of transformer core which could be used on much larger transformers. Accordingly, it was concluded that the method of the present invention could be employed to form articles including larger transformers having the advantages and benefits of the present invention.

EXAMPLE 3

In the process of formulating an elastomeric encapsulant pursuant to the present invention, a number of combinations of ingredients were made and evaluated. From these tests it was concluded that formulations which will give preferred results occur within the following range of ingredients of a soft cure composition based on elastomeric polybutadiene:

| Ingredients | Parts |
|---|---|
| Elastomeric Polybutadiene | 100 |
| Vinyl Toluene | 17 to 25 |
| TMPT | 4 to 8 |
| Lupersol 101 | 2.5 to 5 |
| Inhibitor | 0.1 to 0.9 |

Operable ranges of vinyl toluene and TMPT are deemed to include, respectively, the 0 to 40 parts of vinyl toluene and 0 to 10 parts of TMPT.

The thermal conditioning, which is part of the method of the present invention and, specifically, the conditioning of an embedding compound with a polybutadiene base at a temperature at, above or near the projected end use temperature, avoids the destructive effect of such end use heating if the thermal conditioning has not been carried out prior to an end use. For example, if a soft polybutadiene is taken to higher and higher temperatures without the stepped thermal conditioning of this invention, it will continue to undergo changes and will ultimately be a very hard structure similar to the polybutadiene base composition which starts out as a hard cure composition. However, if the soft cure polybutadiene base composition is step-cured, with the heating during the cure being kept at a selected temperature and at for a selected time, the detrimental changes can be achieved. The conditioning takes place through this practice of curing at or near to end use temperature.

Life tests have been performed on systems of this invention which use the General Electric polyimide coating and also on systems which use the Dupont ML polyimide coating for the wire of the transformer. Both of these materials have been found to be compatible with the high temperature polybutadiene compositions and do produce a 220° C. insulation system.

A test was run in which a polyamide-imide wire coating was used in combination with a high temperature polybutadiene base composition capable of operating at 220° C., but the combination did not produce a 220° C. insulation system.

In another example, we tried some other magnet wire insulations such as modified polyesters in combination with a polybutadiene base composition having a 220° C. treatment and having a 220° C. rating, but the combination did not result in a 220° C. insulation system.

As stated earlier, this invention comtemplates a high temperature and, specifically, a 220° C. system, through the use of a polybutadiene base encapsulant material which is treated to be stabilized and operate at the 220° C. temperature together with and in combination with a compatible and stable wire coating or metal coating insulation layer.

In dealing with the compatible insulating layer relationship, the Applicants have observed that such compatibility can be determined by observation of the performance of the encapsulated electrical equipment at the projected use temperature or at the higher test temperatures. In addition, the mechanism of failure may also be observed by those skilled in the art by dismantling a unit which has failed and observing the mechanism of failure. For example, with regard to the example mentioned above of the combination of a polybutadiene base composition having a 220° C. insulation capability and having a polyamide-imide magnet wire insulation, it was observed that following the test and during the teardown of the life test transformers, the insulation on the wire had been attacked and had been removed from the wire.

It was our observation that there is a difference between the attack on a wire insulation which is dependent on the nature of the metal which forms the wire. Copper wire is inherently less thermally stable because the copper oxide readily oxidized in temperatures above 200° C., evidently due to the diffusion of oxygen through the insulation and oxidation of the surface of the copper. The copper oxide is believed to tend to act as a catalyst for the polymer on the surface of the wire and causes reaction in the polymer to accelerate the degradation of the polymer.

Also, it is believed that the copper oxide has little mechanical strength and that the insulation therefore separates from the magnet wire and flakes off. By contrast, on aluminum magnet wire, the aluminum oxide is rather tenaciously held and does not act as a catalyst in effecting the changes in the polymer.

It is also believed that there is another phenomena occuring in the polymer and this is the production of the low molecular weight molecules due to a decomposition reaction of the polymer at the high use temperatures. These molecules are believed to serve as solvents and to attack the magnet wire. If the manget wire insulation is weakened or is more subject to attack of the solvent, it will be attacked and will be removed from the magnet wire. Therefore, it is believed that if the encapsulating material degrades rather quickly, and releases low molecular weight materials, and if the magnet wire is weak, particularly weak to the solvent released, then the insulation system will degrade quickly and give an indication of lower temperature capability. The magnet wire insulations which are suitable for use in the method and articles of the present invention are those which are less subject to these low molecular weight compounds and solvents and, for example, the polyimide magnet wire enamels or insulation are less subject to attack by low molecular weight compounds and are accordingly suitable for use pursuant to the present invention. Accordingly, pursuant to the present invention, the encapsulating material which degrades at a slower rate and a magnet wire insulation which is less subject to attack by solvents and low molecular weight products of encapsulant degradation are preferred for use in combination to provide an insulation system having the higher temperature capabilities as provided herein.

It will be understood, of course, that where the lower temperature encapsulants are employed and where the encapsulant is retained in a soft state by use of compositions which result in soft cure materials, the use of magnet wire insulation which may be more subject to attack by solvents or low molecular weight materials may be employed without significant loss of operating temperatures as, for example, at 180° C. Thus, the polyester imide magnet wire insulation may be employed with the compositions having the soft cure and the polybutadiene base polymer, although these same polyester imide magnet wire coatings would not be suitable for use in compositions to operate as part of a 220° C. insulation system.

What is claimed and sought to be protected by Letters Patent of the United States is:

1. As an article of manufacture, an inductive device, said device being encapsulated in a cured encapsulant composition, said encapsulant composition prior to its being cured comprising:
   (a) elastomeric polybutadiene of 100 parts consisting of about 54 to about 66 weight percent trans-1,4 polybutadiene, about 16 to about 24 weight percent cis-1,4 polybutadiene, and about 16 to about 24 weight percent vinyl-1,2-polybutadiene;
   (b) vinyl toluene of 0 to 40 parts;
   (c) trimethylol propane trimethacrylate of 0 to 10 parts;
   (d) peroxide crosslinking agent of 2.5 to 5 parts;
   (e) inhibitor of not substantially in excess of 0.9 parts.

2. The article of claim 1 in which the cured encapsulant is soft enough to permit the inductive device to be liberated without significant damage thereto.

3. The article of claim 1 in which the encapsulant has been cured at a temperature proximate the end use temperature.

4. The article of claim 1 or 3 in which the article is rated for a high temperature operating capability of 220° C.

5. The article of claims 1, 2 or 3 in which the range of vinyl toluene and trimethylol propane trimethacrylate is as follows:

| INGREDIENT | PARTS |
| --- | --- |
| vinyl toluene | 17 to 25 |
| trimethylol propane trimethacrylate | 4 to 8 |

\* \* \* \* \*